Aug. 12, 1941.  A. J. RADIN  2,252,408
ORTHOPTIC INSTRUMENT
Filed Sept. 21, 1940  3 Sheets-Sheet 1

INVENTOR
Alexander J. Radin
BY
Simon Broder
ATTORNEY

Aug. 12, 1941.  A. J. RADIN  2,252,408
ORTHOPTIC INSTRUMENT
Filed Sept. 21, 1940  3 Sheets-Sheet 2

INVENTOR
Alexander J. Radin
BY
Simon Broder
ATTORNEY

Patented Aug. 12, 1941

2,252,408

UNITED STATES PATENT OFFICE 2,252,408

ORTHOPTIC INSTRUMENT

Alexander J. Radin, Brooklyn, N. Y.

Application September 21, 1940, Serial No. 357,731

15 Claims. (Cl. 128—76.5)

It is well known that many motor anomolies of the eye muscles may be improved and perhaps corrected by appropriate exercise of the various muscles. For example, strabismus is often treated by subjecting the eye muscles to tension and relaxation for the purpose of achieving accommodation. I may refer to Patent No. 1,949,022 to Mandaville; 2,003,165 to Wooten; 2,089,863 to Updegrave; 2,186,418 to Mandaville; and 2,190,564 to Jones, for examples of orthoptic devices.

So far as I am aware, however, no instrument has been devised for efficaciously exerting a beneficial anterior-posterior pressure on the eyeball—which pressure, of course, will have a tendency (other conditions remaining fixed) to shorten the eyeball and thereby reduce myopia, in which malady the ball is relatively too long for the lens and the image is cast in front of the retina. Since this force is produced by the muscles themselves, there will be no danger of exceeding the critical intro-ocular pressure beyond which the retina may become detached. At best, the muscles can exert but a slight tension on the eye in such manner as to shorten the eyeball, and my invention is concerned primarily with a method of and means for utilizing this phenomenon to the utmost, with a view to coordinating the forces acting on the eyeball to achieve the desired correction of myopic and other refractive disturbances.

The main object of my invention, then, is the provision of instrumentalities for removing and counteracting the lateral and centripetal forces acting on the eyeball, which forces tend to elongate the organ and thereby cause near-sight; and for substituting therefor forces acting anteriorly-posteriorly—that is, axially of the eyeball or in a direction parallel to the axis.

Another object is the equalization of the tone of the muscles acting on opposite sides of the eye. As is well known, reading is accomplished by a series of jerking movements. The eye travels from left to right (in reading English and most other languages) and then clicks back from right to left in one arc to start a new line. These ununiform motions fatigue the muscles and frequently result in imbalance. My device and method are designed to offset these motions, obviate the fatigue, and strengthen and equalize the muscles.

Other objects will appear as the invention is more particularly described.

In carrying out my invention, I utilize an orthoptic device having two lenses for each eye. For convenience, I shall designate the near lens the eye-piece and the far lens the objective. Each lens is prismatic. In the preferred embodiment of my invention, I employ gearing to rotate the left and right objectives continuously and at the same rotary speed, but in opposite directions. The left eye-piece, which, of course, is in line with its objective, is made to rotate at the same speed as its objective, but in the opposite direction. The right eye-piece, however, does not rotate continuously, but, by means of a rack and pinion, rotates back and forth in harmonic or similar movement. Each lens has a definite prismatic dimension, and I have found by actual experiment that the sizes chosen, in co-operation with the speed of movement of the lenses, will result in the beneficial results on the eye muscles already set forth.

Reference is had to the accompanying drawings, forming part of this application, wherein.

Figure 1:
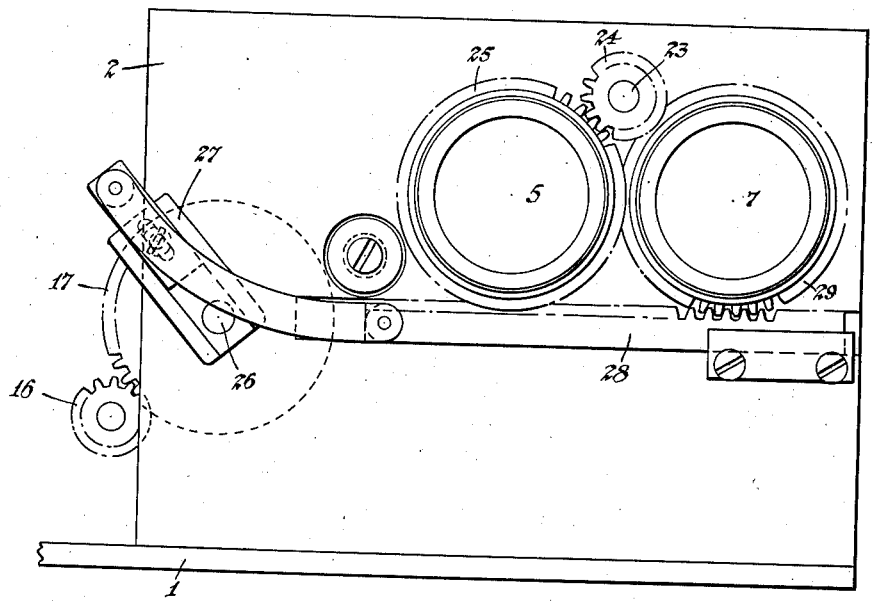
Fig. 1 shows a front elevation of a preferred form of an embodiment of my invention.
Figure 2:
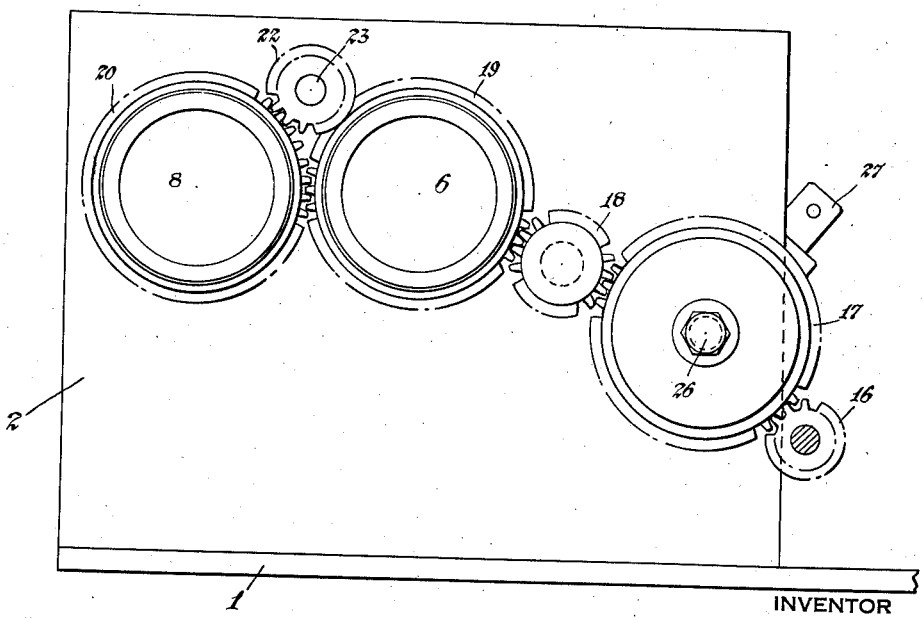
Fig. 2 shows a rear view of the same apparatus.
Figure 3:
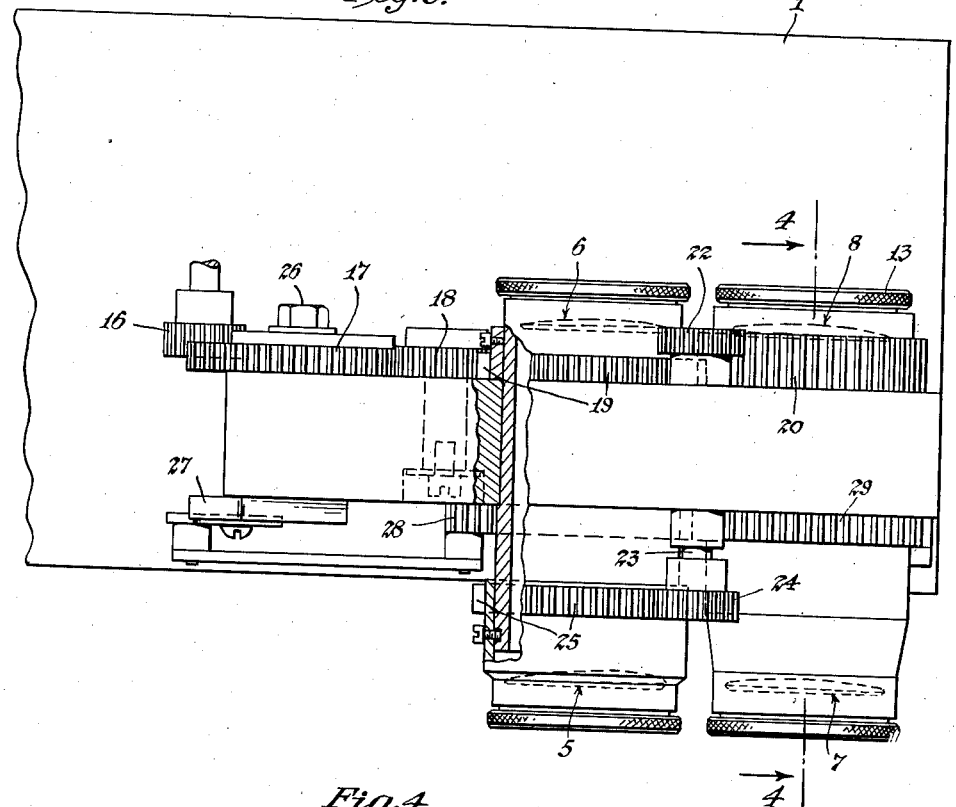
Fig. 3 is a top view, partially in section.
Figure 4:
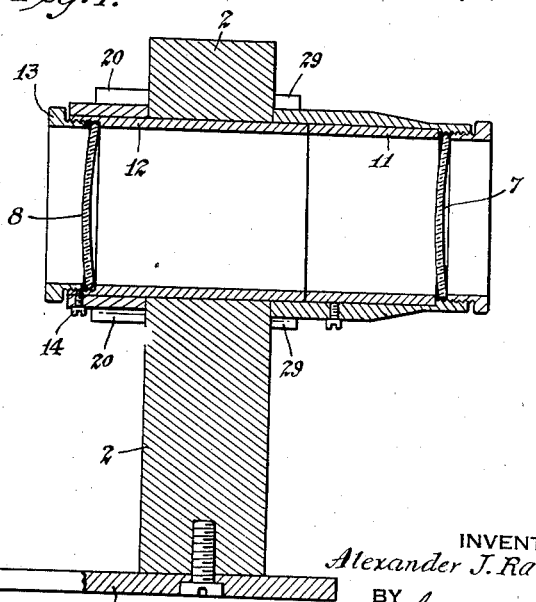
Fig. 4 is a vertical section, taken through the section line 4—4 of Fig. 3.

Figs. 5, 6, 7, and 8 are schematic representations of the four lenses at four equal periods of one complete cycle.

On the base 1 is fixed the vertical support 2 which holds the lenses and associated equipment. The left eyepiece 5 is associated with its objective 6 and the right eyepiece 7 with its objective 8. The optical tube containing each set of lenses is split laterally into two portions 11 and 12 so that each tube portion and corresponding lens may rotate independently of its complementary tube portion and lens. Each lens is removable and replaceable and is held in position by screwing the lens holder 13 against the tube 11, 12 and securing it with a set screw 14.

Motion is imparted to the lenses by a motor (not shown), which may be mounted on the base 1. Energy is received from the motor by the gear 16, which meshes with the gear 17. The gear 17 in turn meshes with the gear 18, which in turn drives the gear 19 which is fixed relatively to the left objective 6 and imparts motion thereto.

The driving gear for the left objective 6 meshes with the gear 20, which is fixed relatively to the right objective 8 and consequently drives the latter in a rotary direction opposite to that of the left objective 6. The gear 20 also meshes with the spur gear 22 fixed on the shaft 23. The shaft 23 is unitary, and on its other end has fixed another spur gear 24 which meshes with the gear 25. The member 25 is fixed relatively to the eyepiece 5 and drives the latter. It will thus be apparent that the lenses 5, 6, and 8 will be rotating continuously once the machine is operating. Naturally, the speed may be controlled, preferably by means of a rheostat in the motor circuit. Lenses 6 and 8 will rotate in opposite directions, and the eyepiece 5 will rotate in a direction opposite to that of its objective 6, all three at the same speed.

The gear 17 is fixed on a shaft 26, on the other end of which is rigidly attached a radial arm 27. A link is pivoted at one end to the arm 27 and at the other end to a horizontal rack 28. The rack meshes with the gear 29 which drives the eyepiece 7. Consequently, the right eyepiece 7 will be given a harmonic reciprocation of 180° back and forth, for each rotation of the gear 17 and the lenses 5, 6, and 8.

The radial arm 27 is adjustable radially, thereby controlling the rate of harmonic reciprocation.

Figure 5:
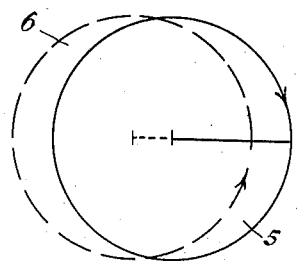
Figure 5:
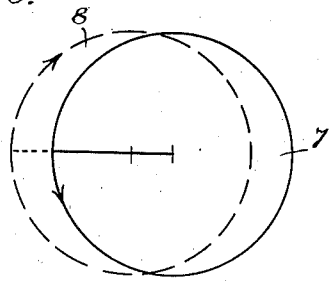

The operation and function of the device are as follows:

The prismatic lenses 5, 6, 7, and 8 are positioned in the tubes 11, 12 with their bases horizontal, as shown schematically in Fig. 5, where the solid circles represent the near eyepieces and the broken circles the far objectives, the line from the circle to the center representing the position of the base of the lens. The arrow shows the direction of rotation an instant after the position has been reached. The lenses are concavo-convex, but it is obvious that they may be convexo-convex, concavo-concave, toric, cylindrical, or any other surface, depending on whether astigmatism, myopia, hypermetropia, strabismus, or other defect is to be treated. While only one eyepiece and one objective are represented as used for an eye, additional lenses may be employed in combination therewith to form an optical system.

As illustrated, the prismatic correction for the left eyepiece 4.5 diopters, for the left objective 1.5 diopters, for the right eyepiece 7.5 diopters, and for the right objective 1.5 diopters. Assume that the motor turns the gear 16 clockwise, looking at Fig. 1. Then the gear 17 will turn counterclockwise, gear 18 clockwise, gear 19 and left objective 6 counterclockwise. Gear 20 and right objective will turn clockwise. Gear 22, shaft 23, and gear 24 will rotate counterclockwise, and gear 25 and left eyepiece 5 clockwise. Arm 27, attached to shaft 26, will turn counterclockwise, sliding rack 28 to the right, and gear 29 and right eyepiece 7 will turn counterclockwise.

Figure 6:
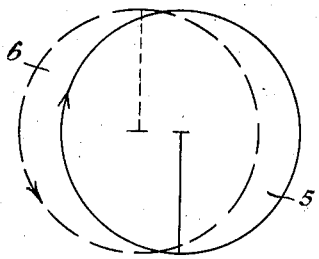
Figure 6:
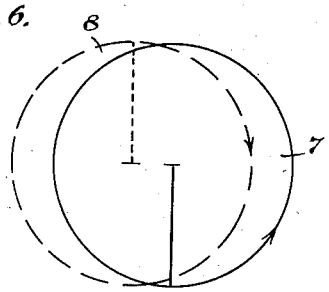

When the lenses have rotated 90°, their positions and directions of rotation will be as illustrated in Fig. 6.

Figure 7:
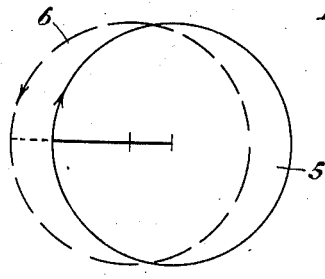
Figure 7:
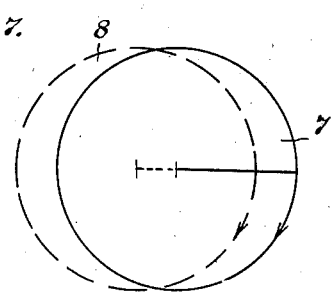

When the lenses have rotated 180°, their positions will be as illustrated in Fig. 7. At this instant, the right eyepiece 7 will be stationary at horizontal dead center. An instant later it will begin to rotate in the opposite direction, clockwise.

Figure 8:
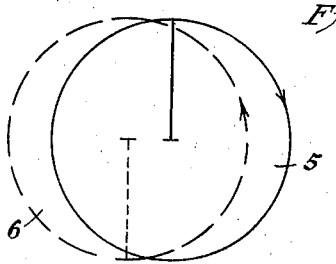
Figure 8:
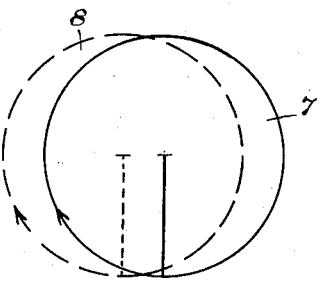

The positions of the lenses and the directions of rotation at 270° are shown in Fig. 8.

At 360 or 0°, the cycle is completed, and the positions of Fig. 5 are again attained. The right eyepiece 7 will again be at horizontal dead center, to the left. An instant later it will reverse rotation and turn counterclockwise.

Although the initial position is represented with the prismatic indicia horizontal, it will be understood that the lenses may be started with their bases coinciding at the vertical, either up or down, as conditions may require.

With reference to Fig. 5, the thickest portion of each lens, as shown, will be toward the inside, and the rays of light from the object will be refracted toward the inside. As the patient tries to focus, the orbital muscles of the eye will attempt to accommodate for the prismatic aberration by drawing the eye in the opposite direction. At 180° the lenses will be reversed about their optical axes and the opposing muscles will come into play. At 90° and 270° other muscles will be activated. By reason of the fact that the right eyepiece 7 is reciprocating continually while the other three lenses are rotating continuously, all the muscles are constrained to function, tensioning and relaxing in an endeavor to converge and accommodate the lines of sight so that the latter may focus emmetropically—that is, sharply at a point on the retina.

These exercises counteract the sphincter effect which reading and other close work have in causing myopia. I have had success in reducing the amount of myopia in several patients after exercising the eye muscles in a series of treatments with my apparatus.

It is obvious that since all the orbital muscles will be beneficially stressed, other refractive errors which are due to muscular action may be corrected. In this connection, I may mention hypermetropia, astigmatism, and strabismus, all of which are relieved with the use of my apparatus and method.

Thus, by utilizing the appropriate lenses, the corresponding muscles may be induced to act on the eye to lengthen it, in order to relieve hypermetropia.

Having now described my invention, what I claim as new and desire to secure by Letters Patent is:

1. In a device of the character described, a pair of eyepieces, a pair of objectives in line with the eyepieces, means for continuously rotating three of said lenses, and means for imparting discontinuous harmonic rotation to the fourth, said last-claimed means comprising a rack and pinion device which is actuated by the same source of energy that actuates the means for continuously rotating the first three lenses.

2. The device set forth in claim 1, wherein the three continuously rotating lenses are rotated at the same speed.

3. The device set forth in claim 1, wherein the three continuously rotating lenses are rotated at the same variable speed.

4. The device set forth in claim 1, wherein the three continuously rotating lenses are rotated at the same speed and the fourth lens is rotated in phase.

5. In a device of the character described, a pair of associated eyepieces and objectives, means for continuously rotating both objectives and one eyepiece exactly in phase, the said eyepiece and the other objective rotating in one direction while the objective to the said eyepiece rotates in the opposite direction, and means for harmonically rotating the other eyepiece back and forth 180° in phase, said last-claimed means comprising a rack and pinion device which is actuated by the same source of energy that actuates the means for continuously rotating the first three lenses.

6. In an optical system, a plurality of aligned eyepieces and objectives, a toothed mounting for each eyepiece and objective, a toothed member in mesh with the mountings for the objectives and for one of the eyepieces, whereby actuation of said toothed member will rotate the associated objectives and eyepiece in synchronism, and a rack in mesh with the mounting for another eyepiece, said rack being actuated by the same source of energy as the toothed member to impart harmonic oscillation to that eyepiece.

7. In an optical system, a pair of aligned eyepieces and objectives, a toothed mounting for each eyepiece and objective, a gear in mesh with the mountings for both objectives to rotate them in opposite directions, a second gear in mesh with the mounting for one of the eyepieces, means for continuously rotating both gears in unison, whereby both objectives and the eyepiece rotate in synchronism, and a rack in mesh with the mounting for the other eyepiece to impart discontinuous harmonic rotation thereto, said rack being interconnected with the two gears.

8. In an optical system, a pair of aligned eyepieces and objectives, a toothed mounting for each eyepiece and objective, a driving gear, intermediary gears between the driving gear and the mountings for both objectives and one eyepiece, whereby continuous rotation of the driving gear will result in synchronous continuous rotation of both objectives and the eyepiece, a rack in mesh with the mounting for the second eyepiece, and an adjustable arm driven by the driving gear and linked to said rack, whereby continuous rotation of the driving gear will result in harmonic oscillation of the second eyepiece.

9. In an optical system, a plurality of lenses including an eyepiece and an objective, a mechanism for transmitting energy from without the optical system to rotate one of said lenses, and rack and pinion means associated with said mechanism and acting in phase therewith for harmonically rotating a second lens.

10. In an optical system, an eyepiece, a gear for transmitting energy from without the optical system to continuously rotate said eyepiece, a second eyepiece, and rack and pinion means associated with said gear and acting in phase therewith for harmonically rotating the second eyepiece.

11. In an optical system, an eyepiece and an objective, a gear for transmitting energy from without the optical system to rotate the objective, and rack and pinion means associated with said gear for harmonically rotating the eyepiece.

12. The combination set forth in claim 11, wherein the rack and pinion means acts in phase with the gear.

13. In an optical system, an eyepiece, a gear for transmitting energy from without the system to rotate the eyepiece, a second eyepiece, and rack and pinion means associated with said gear for harmonically rotating the second eyepiece.

14. The combination set forth in claim 13, wherein the rack and pinion means acts in phase with the gear.

15. The combination set forth in claim 13, including means for varying the in phase relation between the gear and the rack and pinion.

ALEXANDER J. RADIN.